(12) United States Patent
Kawahara et al.

(10) Patent No.: US 6,751,741 B1
(45) Date of Patent: Jun. 15, 2004

(54) COMPUTER POWER MANAGEMENT APPARATUS AND METHOD FOR OPTIMIZING CPU THROTTLING

(75) Inventors: Kohji Kawahara, Yamato (JP); Tsuyoshi Miyamura, Machida (JP); Tomoki Maruichi, Yamato (JP); Takashi Sugawara, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/499,063

(22) Filed: Feb. 4, 2000

(30) Foreign Application Priority Data

Feb. 9, 1999 (JP) ............................................. 11-031426

(51) Int. Cl.⁷ .............................. G06F 1/26; G06F 1/32
(52) U.S. Cl. ......................... 713/320; 713/322; 713/323
(58) Field of Search ................................ 713/320, 322, 713/324, 501, 323

(56) References Cited

U.S. PATENT DOCUMENTS

| | | | | |
|---|---|---|---|---|
| 5,546,568 A | * | 8/1996 | Bland et al. ................. | 713/501 |
| 5,560,020 A | * | 9/1996 | Nakatani et al. ............ | 713/322 |
| 5,590,342 A | * | 12/1996 | Marisetty .................... | 713/324 |
| 5,623,647 A | * | 4/1997 | Maitra ......................... | 713/501 |
| 5,745,375 A | * | 4/1998 | Reinhardt et al. ..... | 364/528.21 |
| 5,754,883 A | * | 5/1998 | Lim et al. ..................... | 710/18 |
| 5,848,281 A | * | 12/1998 | Smalley et al. ............. | 713/322 |
| 6,016,548 A | * | 1/2000 | Nakamura et al. .......... | 713/323 |
| 6,112,309 A | * | 8/2000 | Inoue et al. ................. | 713/501 |
| 6,202,104 B1 | * | 3/2001 | Ober ........................... | 710/18 |
| 6,304,978 B1 | * | 10/2001 | Horigan et al. ............. | 713/322 |

FOREIGN PATENT DOCUMENTS

| | | | | |
|---|---|---|---|---|
| JP | 1292416 | 11/1989 | ............. | G06F/1/04 |
| JP | 3051902 | 3/1991 | ............. | G06G/1/08 |
| JP | 3116311 | 5/1991 | ............. | G06F/1/08 |
| JP | 3123919 | 5/1991 | ............. | G06F/1/04 |
| JP | 3210617 | 9/1991 | ............. | G06F/1/08 |
| JP | 4278612 | 10/1992 | ............. | G06F/1/04 |
| JP | 4311230 | 11/1992 | ........... | G06F/11/30 |
| JP | 5019890 | 1/1993 | ............. | G06F/1/04 |
| JP | 7295695 | 11/1995 | ............. | G06F/1/32 |
| JP | 7302133 | 11/1995 | ............. | G06F/1/04 |
| JP | 7302139 | 11/1995 | ............. | G06F/1/32 |
| JP | 02000039937 A | * | 2/2000 | |

* cited by examiner

Primary Examiner—Thomas Lee
Assistant Examiner—Chun Cao
(74) Attorney, Agent, or Firm—Louis Percello; Anne V. Dougherty

(57) ABSTRACT

A method to reduce the power dissipation of a system by omitting an unnecessary CPU throttling operation in a power management apparatus that performs the CPU throttling operation. A power management apparatus 10 is constituted by an event detecting section 12 to detect an event in a system, an activity detecting section 14 to decide whether the system is in a busy state or in an idle state by checking whether or not there is activity in the system, and a clock control section 16 to execute CPU-clock control. The control section 16 does not perform an unnecessary CPU throttling operation, by stopping the CPU throttling operation when the system is in the idle state and performing the CPU throttling operation only when the system is in the busy state. With this, the power dissipation of the system can be considerably reduced.

11 Claims, 6 Drawing Sheets

COMPUTER POWER MANAGEMENT APPARATUS AND METHOD FOR OPTIMIZING CPU THROTTLING

FIELD OF THE INVENTION

The present invention relates to a power management apparatus and a power management method in a computer system, and more particularly to a power management apparatus and a power management method for optimizing a CPU throttling operation.

BACKGROUND OF THE INVENTION

To reduce the power dissipation of a computer system a great deal of effort has been made. As a result, various techniques of reducing power dissipation have been developed. As one example of the techniques, there is a method of controlling a CPU clock. The CPU clock control method is roughly classified into 3 operations: a stop grant operation, a stop clock operation, and a CPU throttling operation.

(1) The stop grant operation is a method of operating an external clock but stopping only a CPU internal clock. It takes time not more than 1 μs to return to an active state.

(2) The stop clock operation is a method of stopping the external clock in addition to the CPU internal clock. This operation can further suppress power dissipation, compared with the stop grant operation. However, since the external clock is also stopped, it takes 0.5–1 ms to return to the active state.

(3) The CPU throttling operation is a method of reducing an operating frequency of a CPU falsely and suppressing power dissipation, by making a periodic transition alternately between a stop grant state and an active state.

In actual applications, either one or the other of the following methods is usually adopted.

(a) Use only one of the above-mentioned operations (1)–(3); or (b) execute either the stop clock operation or the stop grant operation, while performing the CPU throttling operation.

Under the circumstances where there are many activities, however, the operating system (OS) will not issue a CPU-idle call and therefore a chance to go into the stop grant operation or the stop clock operation will not be obtained. For this reason, under the circumstances where there are many activities, it is practically impossible to execute the stop grant operation or the stop clock operation. To realize low power dissipation even in such circumstances, there is a need to execute the CPU throttling operation that can be controlled by hardware which is not influenced by the OS.

The selection of executing the CPU throttling operation or not is performed by a user in initializing the system. The operation of the CPU clock control method, in the case where a user selects the CPU throttling operation when initializing the system, will be described in reference to a flowchart shown in FIG. 4.

When power is turned on, the system is performing the CPU throttling operation (step S1). At this time, if the operating system issues a CPU idle call (step S2), the system stops the CPU throttling operation and makes a transition to either the stop clock state or the stop grant state. The system judges whether or not there is activity, in order to determine which transition it makes (step S3). If there is no activity (No), the system makes a transition to the stop clock state (step S4). If there is activity (Yes), the system makes a transition to the stop grant state (step S5). When the system is in the stop clock state (step S4) or the stop grant state (step S5), if a stop brake event occurs, the system returns to the active state and restarts the CPU throttling operation (step S1). Thereafter, the above-mentioned steps are repeated.

The state in which there is no activity in a system, as in the state in which there is no process, is called an idle state. When a user is executing a task that does not require CPU power so significantly, the greater part of the system driving time is occupied by the idle state which waits for input from a user. Therefore, a reduction in the power dissipation of a computer system depends upon the suppression of power dissipation in the idle state.

FIG. 5 is a diagram showing an example of the state transition of a CPU in the case where a system executes CPU throttling operation when it is in an idle state. In the diagram there is shown the case where the throttling duty is 100%, 50%, 25%, and 12.5%. As described above, the CPU throttling operation is performed when the CPU makes a periodic transition between an active state and a stop grant state. The throttling duty ratio is the ratio of a period during which the CPU is in the active state to a total period during which the CPU is in the active state and stop grant state during CPU throttling operation. Therefore, in the case of a 100% throttling duty ratio, the CPU is in the active state for the full period. Conversely speaking, the stop grant period is zero, so there is no CPU throttling operation. In the case of a 50% throttling duty ratio, the CPU is in the active state for only half the total period. In the case of a 25% throttling duty ratio, the CPU is in the active state for only one-fourth the total period. In the case of a 12.5% throttling duty ratio, the CPU is in the active state for only one-eighth the total period. From the viewpoint of reducing power dissipation in a system, a smaller throttling duty ratio is advantageous. The reason is that, if the throttling duty ratio is smaller, the ratio of the period during which the CPU is in the active state will become smaller. In FIG. 5, the horizontal axis indicates a system timer T along with time t.

In the stop clock state, power dissipation can be maximally suppressed, because an external clock is also stopped, as described above. However, as will be seen from FIG. 5, if CPU throttling operation is performed, the period during which the CPU is in the stop clock state will be shortened. Furthermore, this period will become shorter if the throttling duty ratio is reduced. That is, if CPU throttling operation is performed for reducing power dissipation of the system, the power dissipation will increase to the contrary. Moreover, if the throttling duty ratio is made smaller to obtain a further reduction in the power dissipation, the power dissipation will conversely increase.

The system returns from the stop grant state or the stop clock state to the active state by a stop brake event. When the system is in the idle state, the stop brake event of returning the system from the stop clock state is only an interruption by the system timer T. The system timer T occurs periodically and the period depends upon an operating system (OS). For instance, the period is 13.75 ms for Windows 95 (trademark) and 5 ms for Windows 98 (trademark). Therefore, between Windows 95 (trademark) and Windows 98 (trademark), the ratio of the stop clock state to the system timer T differs.

FIG. 6 is a diagram showing the state duty ratio of the CPU for comparison of different system timers. FIGS. 6(a) and 6(b) show the case of Windows 95 (trademark) and the case of Windows 98 (trademark), respectively. As shown in FIG. 6, if in Windows 98 (trademark) the throttling duty ratio is set to 12.5%, the ratio of the stop clock state will be reduced down to about 50%.

From FIGS. 5 and 6 it follows that:

(1) If, in CPU throttling operation, the throttling duty ratio is made smaller, the ratio of the stop clock state to the system timer will become smaller.

(2) If the period T of the system timer is shorter, the ratio of the stop clock state to the system timer will become shorter.

As described above, if the ratio of the stop clock state to the system timer is greater, the effect of reducing power dissipation will be greater. The above-mentioned (1) and (2), however, show that if the CPU throttling operation is performed by background art, the ratio of the stop clock state to the system timer will become smaller. Therefore, the background art has the problem that if the system in the idle state performs the CPU throttling operation, power dissipation will increase to the contrary.

The present invention has been made in order to solve the above-mentioned problem.

An object of the present invention is to provide a power management apparatus and a power management method in a computer system which are capable of realizing effective low power dissipation in the computer system, by controlling the form of executing CPU throttling operation.

SUMMARY OF THE INVENTION

The power management apparatus for a computer system, according to the present invention, is a power management apparatus for a computer system which performs a CPU throttling operation of falsely reducing an operating frequency of a central processing unit (CPU). The power management apparatus is constituted by an event detecting section, an activity detecting section, and a clock control section. The event detecting section detects an event in the system. The activity detecting section decides whether the system is in a busy state or in an idle state, by checking whether or not there is activity in the system when the event detecting section detects the event. The clock control section starts the CPU throttling operation when the system is in the busy state and stops the CPU throttling operation when the system is in the idle state, based on the decision of the activity detecting section.

The power management method for a computer system, according to the present invention, is a power management method for a computer system which performs a CPU throttling operation of falsely reducing an operating frequency of a central processing unit (CPU). First, it is judged whether the system is in a busy state or in an idle state. As a result, the CPU throttling operation is started when the system is in the busy state, and the CPU throttling operation is stopped when the system is in the idle state.

The power management method for a computer system, according to the present invention, can be programmed by using various program languages. And this program can be recorded on a computer-readable storage medium.

As described above, in the power management apparatus and method for a computer system according to the present invention, the CPU throttling operation is stopped when the system is in the idle state, and the CPU throttling operation is performed only when the system is in the busy state. Therefore, since an unnecessary CPU throttling operation is not performed, system power dissipation can be considerably reduced.

BRIEF DESCRIPTION OF THE DRAWINGS

The invention will now be described in greater detail with specific reference to the appended drawings wherein.

DETAILED DESCRIPTION OF THE PREFERRED EMBODIMENT

Figure 1:
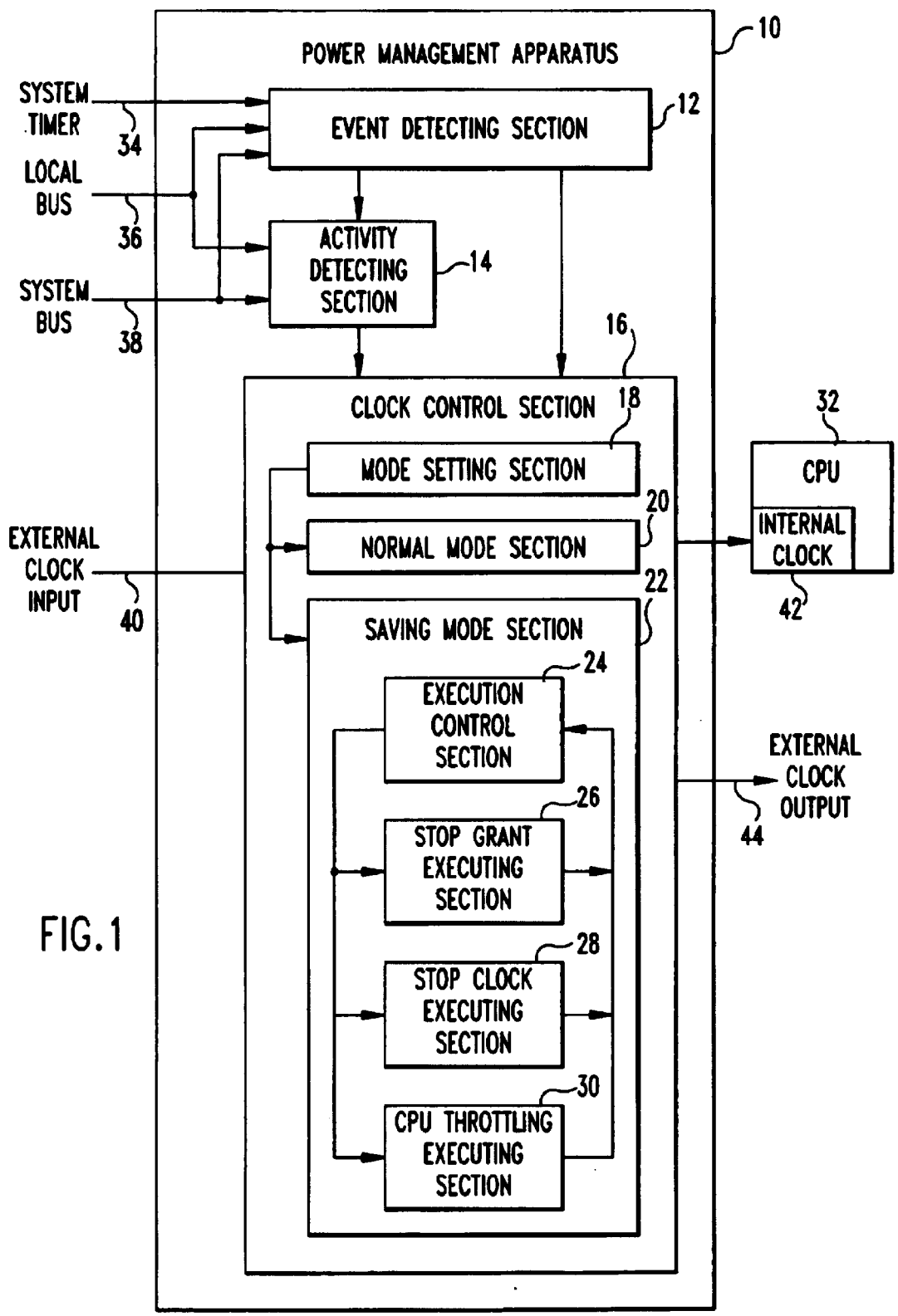
FIG. 1 is a diagram showing a power management apparatus according to one embodiment of the present invention.

As one of the techniques of reducing the power dissipation of a computer system, there is a method of controlling a CPU clock. The CPU clock control method is roughly classified into 3 operations: a stop grant operation, a stop clock operation, and a CPU throttling operation.

(1) The stop grant operation is a method of operating an external clock but stopping only a CPU internal clock. The system goes into this state by software (normally, advanced power management (APM) basic input/output system (BIOS)) and returns from this state by hardware event such as an interrupt request (IRQ). The internal clock alone stops, but the external clock operates. Therefore, the system can return to the active state in a time no more than 1 $\mu$s.

(2) The stop clock operation is a method of stopping the external clock in addition to the CPU internal clock. This operation can further suppress power dissipation, compared with the stop grant operation. In this state, a video chip, such as an accelerated graphics port (AGP), and a synchronous dynamic random access memory (SDRAM) also stop their function. Therefore, a system mounting these chips can further reduce power dissipation. The other mechanisms are the same as the stop grant operation. That is, the system goes into this state by software and returns from this state by a hardware event. However, since the stop clock operation is also a method of stopping an external clock, the time for an external clock to operate stably is required when the system returns to the active state. For this reason, at least a delay of 500 $\mu$s–1 ms occurs. Therefore, the stop clock operation must be carefully used. Otherwise, a considerable reduction in device performance or a problem such as system hanging will be caused.

(3) The CPU throttling operation is a method of reducing an operating frequency of a CPU falsely and suppressing power dissipation, by making a periodic transition alternately between a stop grant state and an active state (in which a CPU is operating) by the operation of hardware. In this method there is also a burst mode of stopping a CPU throttling operation for a fixed time when an event (hardware event such as an interrupt request (IRQ) and a data transfer request (DRQ)) occurs due to activity.

In actual applications, either one or the other of the following methods is usually adopted.

(a) Use only one of the above-mentioned operations (1)–(3); or (b) execute either the stop clock operation or the stop grant operation, while performing the CPU throttling operation.

Normally, the stop grant operation and the stop clock operation are executed by APM BIOS when the operating system (OS) makes a CPU-idle call. The CPU throttling operation is used when a reduction in power dissipation is desired, even if the speed of executing the CPU became slow. For example, in the case of a notebook type personal computer being driven by a battery, the CPU throttling operation is used under high-temperature environment, because the life of the battery will be shortened if temperature becomes high. Also, under mobile environment where a commercial power source is not obtained, the CPU throttling operation is used when battery-driven time is lengthened.

Under the circumstances where there are many activities, however, the operating system (OS) will not issue a CPU-idle call. For this reason, under the circumstances where there are many activities, it is practically impossible to execute the stop grant operation or the stop clock operation. To realize low power dissipation of the system even in such circumstances, there is a need to execute the CPU throttling operation that can be controlled by hardware.

FIG. 1 is a diagram showing the power management apparatus according to one embodiment of the present invention. A power management apparatus 10 comprises an event detecting section 12, an activity detecting section 14, and a clock control section 16. A system timer 34, a local bus 36, and a system bus 38 are connected to the event detecting section 12. The local bus 36 is connected to peripheral equipment that operates at high speeds, such as a hard-disk drive (HDD) and a graphic display mechanism (not shown). As a typical example, there is a peripheral component interconnect (PCI) bus. The system bus 38 is connected to peripheral equipment that operates at low speeds, such as a keyboard and a floppy disk drive (FDD). As a typical example, there is an industrial standard architecture (ISA) bus.

The event detecting section 12 always monitors the local bus 36 and the system bus 38 and detects an event within the system. Also, the system timer 34 is input to the event detecting section 12. The system timer 34 is periodically produced by the operating system (OS). The period is, for example, 13.75 ms for Windows 95 (trademark) and 5 ms for Windows 98 (trademark). The system timer 34 is a stop brake event and forces the CPU in the stop clock state to return to the active state. The reason is that, if it is not so, it will cause system hang states. If the event detecting section 12 detects an event, it informs the activity detecting section 14 of the event.

If the activity detecting section 14 receives a notice about detection of an event from the event detecting section 12, the activity detecting section 14 checks the activity of the system. As a result, when activity is not detected between the previous notice and the present time, the activity detecting section 14 judges that the system is in the idle state. When activity is detected, the activity detecting section 14 judges that the system is in the busy state. These judgment results are output to the clock control section 16. The clock control section 16 comprises a mode setting section 18, a normal mode section 20, and a saving mode section 22.

The mode setting section 18 performs setting so that the power management apparatus 10 is operated either in the normal mode or in the saving mode. This setting is performed, for example, by the environmental setting for the system. The mode setting section 18 selects either the normal mode section 20 or the saving mode section 22 in accordance with the set contents. Under the normal mode in which the normal mode section 20 operates, an external clock input 40 to be input, as it is, is output as both an internal clock 42 for a CPU 32 and an external clock output 44 for driving the peripheral equipments.

The saving mode section 22 executes the above-mentioned three CPU clock control methods (stop grant operation, stop clock operation, and CPU throttling operation). For this reason, the saving mode section 22 comprises an execution control section 24, a stop grant executing section 26, a stop clock executing section 28, and a CPU throttling operation executing section 30. The execution control section 24 controls each section for executing the CPU-clock control, based on notices from the event detecting section 12 and the activity detecting section 14. The stop grant executing section 26 executes the above-mentioned stop grant operation. The stop clock executing section 28 executes the above-mentioned stop clock operation. The CPU throttling executing section 30 executes the above-mentioned CPU throttling operation.

Figure 2:
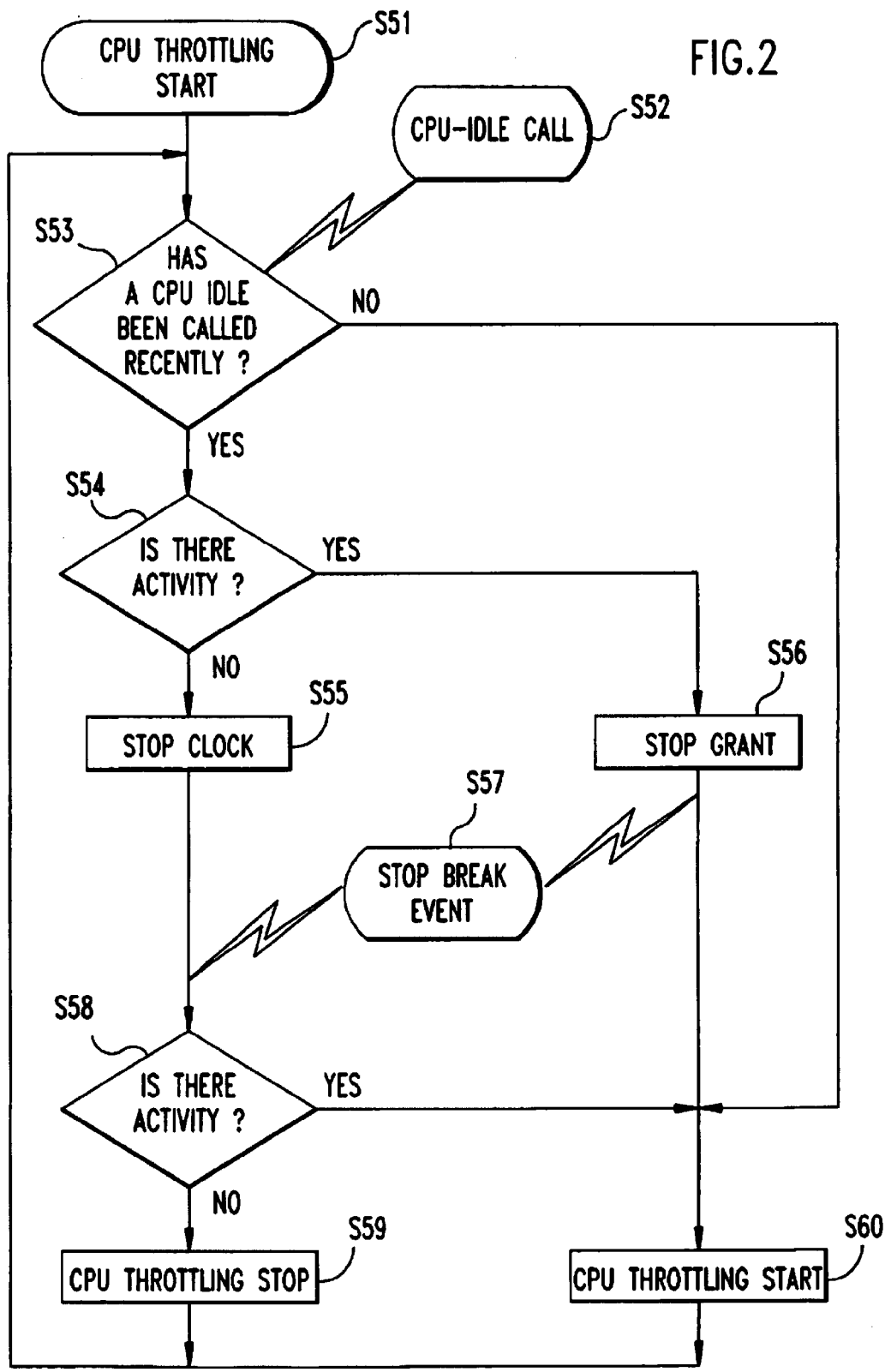
FIG. 2 is a flowchart showing a power management method according to the one embodiment of the present invention.

Next, the power management method according to an embodiment of the present invention will be described in reference to a flowchart shown in FIG. 2. As an example, consider the power management method in the case of selecting the CPU throttling operation in initializing the system.

In initializing the system, the CPU throttling operation is selected. Thus, when power is turned on, the system executes the CPU throttling operation (step S51).

First, detect that a CPU-idle operation has not been called for a fixed time (step S52). That is, detect whether or not the CPU-idle operation has recently been called (step S53). If "NO," the system goes to step S60 and continues the CPU throttling operation. If "YES," the system goes to step S54.

In step S54 it is checked whether or not there is activity in the system. When activity is not detected between the previous activity-checking time and the present checking time (No), it is judged that the system is in the idle state. When activity is detected (Yes), it is judged that the system is in the busy state. In the case of NO where the system is in the idle state, the system goes to step S55. In the case of YES where the system is in the busy state, the system goes to step S56.

In step S55, the system goes into the stop clock state.

In step S56, the system goes into the stop grant state.

If the system in the stop grant state (step S56) receives a stop break event (step S57), the system starts the CPU throttling operation (step S60).

If the system in the stop clock state (step S55) receives the stop break event (step S57), the system checks whether or not there is activity (step S58). As an example of the stop break event, there is an input from a keyboard or a system timer. When activity is detected (Yes), the system judges that it is in the busy state and goes to step S60. When activity is detected (No), the system judges that it is in the idle state and goes to step S59.

In step S60, the system starts the CPU throttling operation. In step S59, the system stops the CPU throttling operation. Subsequently, the system returns from steps S59 and S60 to step S53. Thereafter, the system repeats the aforementioned steps.

As described above, the stop of the CPU throttling operation is continued as long as the system is in the idle state. The reason is that if the judgment in step S53 is "YES" and also the judgment in step S54 is "NO," the system goes into the stop clock state (step S55), but if the stop break event (step S57) is the system timer, the judgment in step S58 is "NO" and the stop of the CPU throttling operation in step S59 continues.

According to this embodiment, as described above, the stop of the CPU throttling operation continues, as long as the system is in the idle state and also activity is not detected. Therefore, the period in which the system is in the stop clock state can be sufficiently lengthened. Thus, the power dissipation of the system can be considerably reduced.

The above-mentioned power management method in a computer system, according to the embodiment of the present invention, can be programmed with various program languages. This program can be recorded on a memory mounted in a computer system such as a ROM, a portable storage medium such as a floppy disk, a CD-ROM (read only memory using a compact disk), and an MO disk, or a computer-readable storage medium such as a file device provided in a server computer connected to a network.

An example of a computer system, to which the above-mentioned power management apparatus and power management method in a computer system according to the embodiment of the present invention are applied, will be described with FIG. 3.

Figure 3:
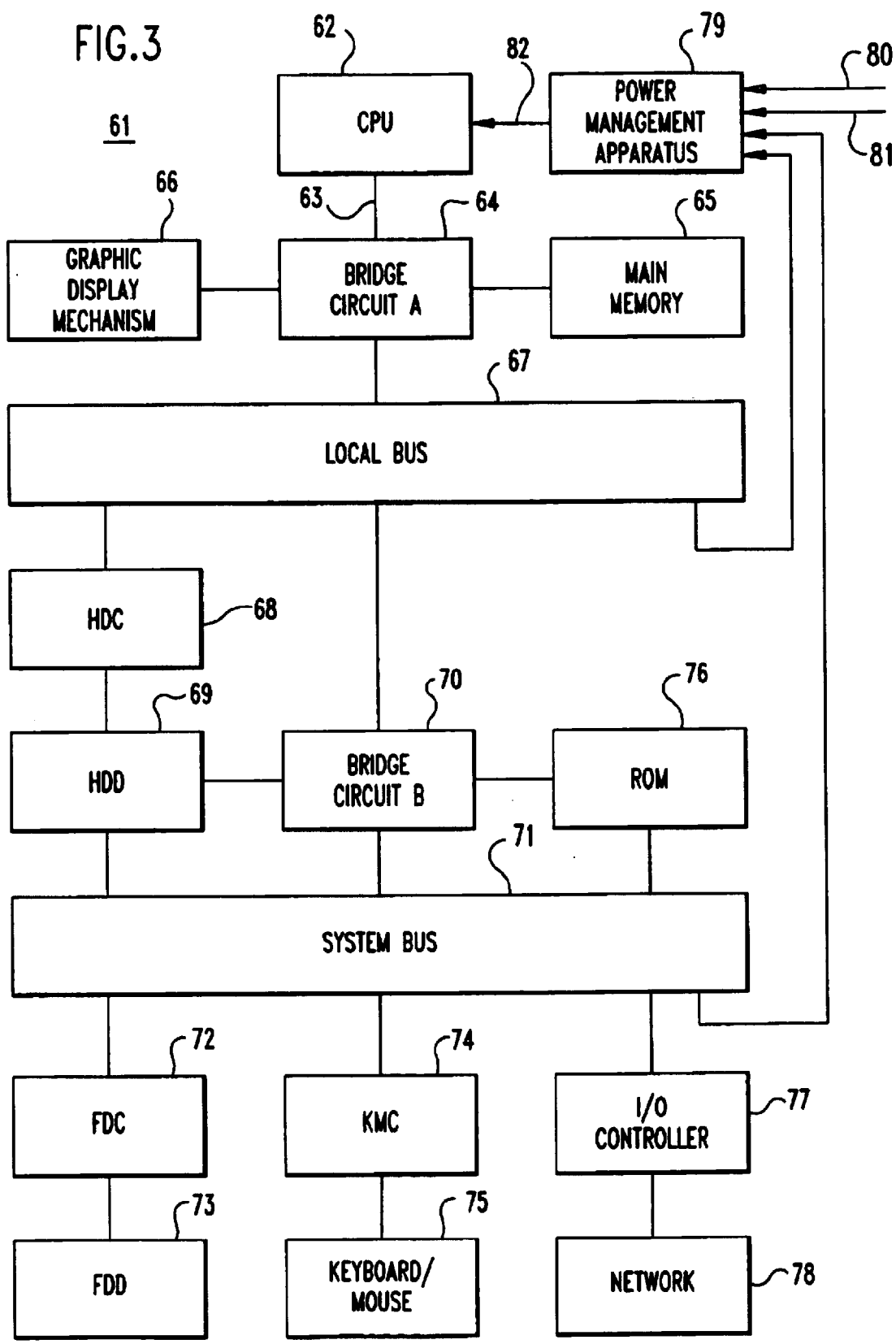
FIG. 3 is a diagram showing an example of a computer system to which the power management apparatus and method in a computer system, according to the one embodiment of the present invention, are applied.
Figure 4:
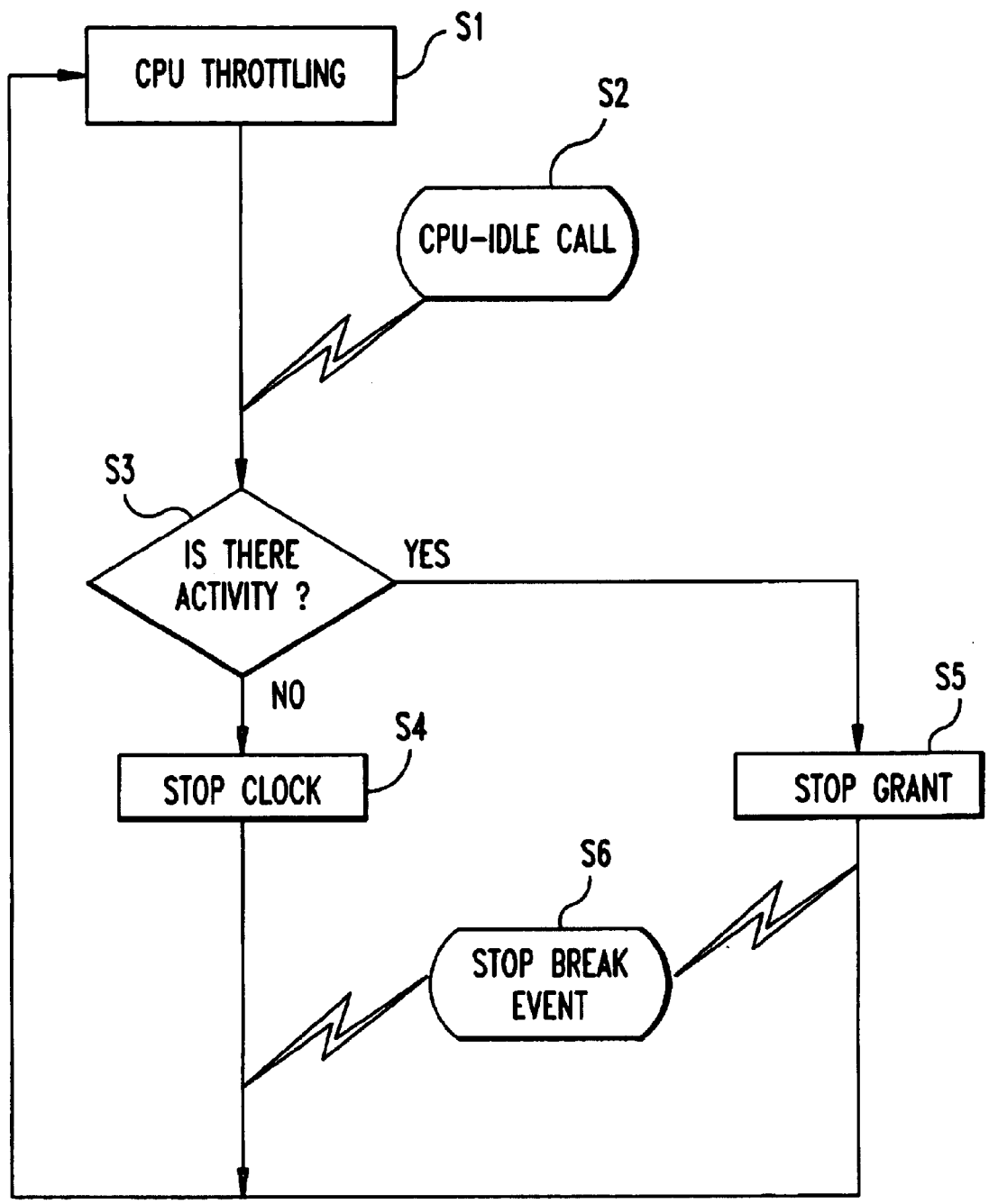
FIG. 4 is a flowchart showing the operation of a CPU clock control method in the case where a user selects a CPU throttling operation in initializing a system.
Figure 5:
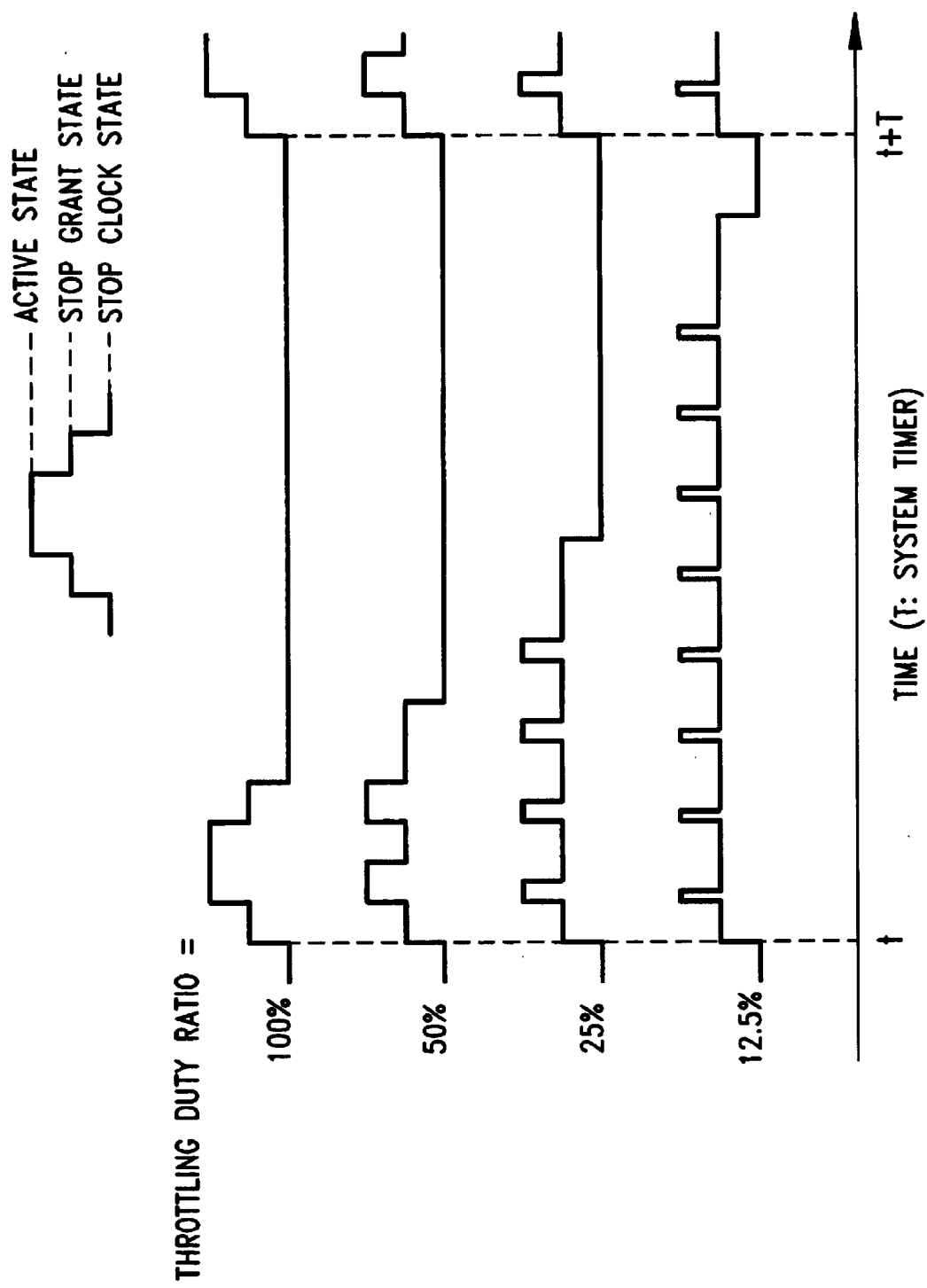
FIG. 5 is a diagram showing an example of the state transition of a CPU in the case where the system executes a CPU throttling operation when it is in an idle state.
Figure 6:
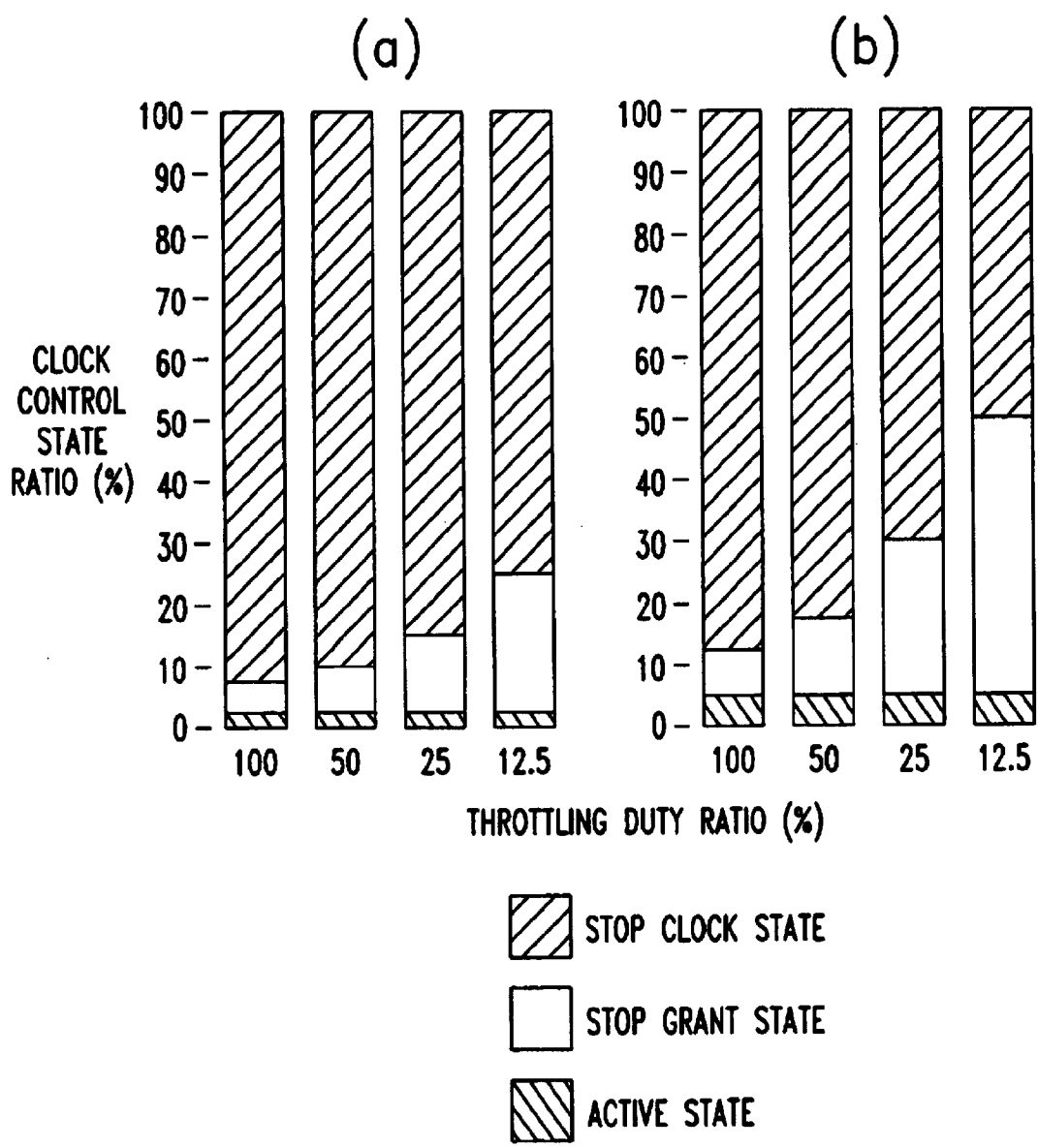
FIG. 6 is a diagram showing the state duty ratio of the CPU for comparison of different system timers.

The computer system 61 shown in FIG. 3 is constituted chiefly by a CPU 62, a processor bus 63, a bridge circuit A 64, main memory 65, a graphic display mechanism 66, a local bus 67, a hard disk controller (HDC) 68, a hard disk drive (HDD) 69, a bridge circuit B 70, a system bus 71, a floppy disk controller (FDC) 72, a floppy disk drive (FDD) 73, a keyboard/mouse controller 74, a keyboard/mouse 75, a read-only memory (ROM) 76, an I/O controller 77, a network 78, and a power management apparatus 79.

The local bus 67 is a bus for connecting peripheral equipment, which operates at high speeds, such as the HDD 69. For example, a peripheral component interconnect (PCI) bus is employed. The PCI bus is local bus architecture designed by PCI Special Interest Group (which is a standardization group in which a hundred and a few ten companies, such as IBM and Compaq, participated with Intel as center).

The system bus 71 is a bus for connecting peripheral equipment, which operates at low speeds, such as the FDD 73 or the keyboard/mouse 75. For example, an industry standard architecture (ISA) bus is employed. The ISA bus is an extended bus internationally standardized based on the extended bus adopted in IBM PCs/ATs.

The processor bus 63 is a bus that operates at superhigh speed. This bus depends upon the kind of the CPU 62 and is individually manufactured by computer makers. The processor bus 63 and the local bus 67 are connected via the bridge circuit A 64. The bridge circuit A 64 is constituted, for example, by a memory/PCI control chip set.

The graphic display mechanism 66 controls data that is output to a display unit such as a CRT or an LCD. The graphic display mechanism 66 and the bridge circuit A 64 are connected, for example, by an accelerated graphic port (AGP) bus. The AGP bus is the improvement of the PCI bus and can be used as an exclusive bus for connecting circuitry related to an image display such as a graphics card.

The local bus 67 and the system bus 71 are connected via the bridge circuit B 70. The bridge circuit B 70 is constituted, for example, by a PCI-ISA bridge chip.

The HDD 69 stores various programs including an operating system (OS). Note that a system program, such as the OS, and application programs may be stored in other memory such as a read-only memory (not shown).

The power management apparatus 79 employs the power management apparatus 10 shown in FIG. 1. The power management apparatus 79 receives the system timer 80 and the external clock input 81. The power management apparatus 79 also monitors the local bus 67 and the system bus 71. The power management apparatus 79 outputs or stops the internal clock 82 of the CPU 62.

The operation of the computer system 61 shown in FIG. 3 will hereinafter be described. As described above, the power management method in a computer system, according to this embodiment of the present invention, can be programmed with various program languages. This program will hereinafter be referred to as a power management program.

This program is recorded on a computer-readable storage medium. The storage medium can employ memory mounted in a computer system such as a ROM, an electrically erasable programmable read only memory (EEPROM) and a flash EEPROM, a portable storage medium such as a floppy disk, a CD-ROM, and an MO disk, or a file device provided in a server computer connected to a network.

The power management program recorded on the storage medium is loaded into the computer system 61 in the following manner. The loading method is divided into two methods when the storage medium is memory mounted in the computer system 61. When the storage medium is a read-only memory (ROM), the power management program is written to the ROM during semiconductor fabrication. Thereafter, the ROM is mounted in the computer system 61 (e.g., the ROM 76 shown in FIG. 3 is equivalent to this case).

When the storage medium is an electrically erasable programmable read only memory (EEPROM) or a flash EEPROM (hereinafter referred to as a PROM), the loading method is performed as follows. Some of the PROMs store the old power management program that does not have the functions of the power management program according to this embodiment. And the PROM is mounted in the computer system 61. To update the old power management program written to the PROM to the power management program according to this embodiment, the following operations are required. For instance, the FD recording the power management program according to this embodiment is put into the FDD 73 and the power management program recorded on the FD is read in. The read power management program is overwritten in the PROM. Or, after the stored contents in the PROM have been erased, the power management program is read in. The same is true of the case where the storage medium storing the aforementioned power management program is a portable storage medium such as a CD-ROM or an MO disk.

When the storage medium is a file device on a network, the power management program according to this embodiment, recorded on the file device through the network 77, is downloaded. The downloaded power management program is written to the PROM. The writing method, as in the aforementioned method, is performed either by overwriting or by rewriting after erasure.

With the power management program downloaded into the computer system 61 in the aforementioned manner, the operating system reconfigures the power management apparatus 78. With this, the aforementioned power management apparatus 78 in a computer system, according to this embodiment of the present invention, is obtained. The power management apparatus 78 thus constructed executes the aforementioned power management method in a computer system according to this embodiment of the present invention.

As described above, in the power management apparatus and method used for a computer system according to the present invention, the CPU throttling operation is stopped when the system is in the idle state, and the CPU throttling operation is performed only when the system is in the busy state. Therefore, since an unnecessary CPU throttling operation is not performed, system power dissipation can be considerably reduced.

What is claimed is:

1. A power management apparatus used for a computer system which performs a CPU throttling operation of falsely reducing an operating frequency of a central processing unit (CPU), the power management apparatus comprising:

an event detecting section to detect an event in said system;

an activity detecting section to determine whether said system is in one of a busy state or an idle state, by checking whether there is activity in said system when said event detecting section detects said event; and a clock control section to start said CPU throttling operation when said system is in the busy state and to stop said CPU throttling operation when said system is in the idle state, wherein said clock control section includes a stop grant executing section, a stop clock executing section, and a CPU throttling executing section;

said stop grant executing section causing said system to be in a stop grant state when said system is in the busy state;

said stop clock executing section causing said system to be in a stop clock state when said system is in the idle state; and said CPU throttling executing section starting said CPU throttling operation when said system returns from the stop grant state and stopping said CPU throttling operation when said system returns from the stop clock state by a system timer, wherein said CPU throttling executing section starts said CPU throttling operation when said system returns from the stop grant state and when said system returns from the stop clock state due to an event other than said system timer, and stops said CPU throttling operation when said system returns from the stop clock state by said system timer.

2. A power management apparatus used for a computer system which performs a CPU throttling operation of falsely reducing an operating frequency of a central processing unit (CPU), the power management apparatus comprising:

an event detecting section to detect an event in said system;

an activity detecting section to determine whether said system is in one of a busy state or an idle state, by checking whether there is activity in said system when said event detecting section detects said event; and a clock control section to start said CPU throttling operation when said system is in the busy state and to stop said CPU throttling operation when said system is in the idle state, wherein said event detecting section detects a CPU-idle call issued by an operating system.

3. A power management method for a computer system which performs a CPU throttling operation of falsely reducing an operating frequency of a central processing unit (CPU), the power management method comprising the steps of:

detecting at least one event which may require CPU throttling;

judging whether said system is in one of a busy state and an idle state by checking whether there is activity in the system when an event has been detected;

starting said CPU throttling operation when said system is in the busy state;

stopping said CPU throttling operation when said system is in the idle state, causing said system to be in a stop grant state when said system is in the busy state;

causing said system to be in a stop clock state when said system is in the idle state;

wherein said starting comprises starting said CPU throttling operation when said system returns from said stop grant state; and wherein said stopping comprises stopping said CPU throttling operation when said system returns from said stop clock state by a system timer and further comprising starting said CPU throttling operation when said system returns from said stop clock state by an event other than a system timer.

4. A power management method for a computer system which performs a CPU throttling operation of falsely reducing an operating frequency of a central processing unit (CPU), the power management method comprising the steps of:

detecting at least one event which may require CPU throttling;

judging whether said system is in one of a busy state and an idle state by checking whether there is activity in the system when an event has been detected;

starting said CPU throttling operation when said system is in the busy state;

stopping said CPU throttling operation when said system is in the idle state;

causing said system to be in a stop grant state when said system is in the busy state;

causing said system to be in a stop clock state when said system is in the idle state;

wherein said starting comprises starting said CPU throttling operation when said system returns from said stop grant state; and wherein said stopping comprises stopping said CPU throttling operation when said system returns from said stop clock state by a system timer, and wherein said detecting comprises detecting a CPU-idle call issued by an operating system and further comprising the steps of:

when said system returns from the stop clock state, checking an event that is a primary cause of the return; and starting said CPU throttling operation when an event other than a system timer is detected as a primary cause of the return from the stop clock state.

5. A power management method for a computer system which performs a CPU throttling operation of falsely reducing an operating frequency of a central processing unit (CPU), the power management method comprising the steps of:

detecting a CPU-idle call issued by an operating system;

judging that said system is in a busy state when the CPU-idle call is not detected and then starting said CPU throttling operation;

checking whether or not there is activity in said system when the CPU-idle call is detected, judging that said system is in the busy state when there is activity, and judging that said system is in an idle state when there is no activity;

causing said system to be in a stop grant state when said system is in the busy state;

causing said system to be in a stop clock state when said system is in the idle state;

starting said CPU throttling operation when said system returns from the stop grant state;

when said system returns from the stop clock state, checking an event that is a primary cause of the return;

starting said CPU throttling operation when an event other than a system timer is detected as a primary cause of the return from the stop clock state; and stopping said CPU throttling operation when the system timer is detected.

6. A computer readable storage medium for a computer system which stores a power management program that performs a CPU throttling operation of falsely reducing an operating frequency of a central processing unit (CPU), the power management program comprising the steps of:

detecting at least one event that may require CPU throttling;

judging whether said system is in one of a busy state and an idle state;

starting said CPU throttling operation when said system is in the busy state; and stopping said CPU throttling operation when said system is in the idle state, wherein said power management program further comprises the steps of:
causing said system to be in a stop grant state when said system is in the busy state; and
causing said system to be in a stop clock state when said system is in the idle state,
wherein the power management program further comprises the steps of:
starting said CPU throttling operation when said system returns from said stop clock state by an event other than a system timer.

7. A computer readable storage medium for a computer system which stores a power management program that performs a CPU throttling operation of falsely reducing an operating frequency of a central processing unit (CPU), the power management program including the steps of:

detecting a CPU-idle call issued by an operating system;

checking whether there is activity in said system when the CPU-idle call is detected, judging that said system is in a busy state when there is activity, and judging that said system is in an idle state when there is no activity;

causing said system to be in a stop grant state when said system is in the busy state;

causing said system to be in a stop clock state when said system is in the idle state;

starting said CPU throttling operation when said system returns from the stop grant state;

when said system returns from the stop clock state, checking an event that is a primary cause of the return;

starting said CPU throttling operation when an event other than a system timer is detected as a primary cause of the return from the stop clock state; and stopping said CPU throttling operation when the system timer is detected.

8. A computer system comprising:

a central processing unit (CPU);

a power management apparatus to perform a CPU throttling operation of falsely reducing an operating frequency of said CPU;

a storage device storing an operating system; and a storage-medium reading device that can read stored contents of the storage medium according to claim 7;

wherein under control of said operating system, a power management program in the computer system, read by said storage-medium reading device is executed to reconfigure said power management apparatus.

9. The computer system according to claim 8, wherein said storage-medium reading device is a portable storage-medium reading device.

10. The computer system according to in claim 8, wherein said storage-medium reading device is a network connecting device.

11. A computer system comprising:

a first storage device storing an operating system; and a second storage device comprising the storage medium for a computer system which stores a power management program that performs a CPU throttling operation of falsely reducing an operating frequency of a central processing unit (CPU), comprising:
at least one detecting component for detecting at least one event that may require CPU throttling;
at least one state judging component for judging whether said system is in one of a busy state and an idle state;
CPU throttling means for starting said CPU throttling operation when said system is in the busy state and stopping said CPU throttling operation when said system is in the idle state,
wherein said power management program further comprises the means for:
causing said system to be in a stop grant state when said system is in the busy state; and
causing said system to be in a stop clock state when said system is in the idle state,
and wherein the power management program further starts said CPU throttling operation when said system returns from said stop clock state by an event other than a system timer, and
wherein under control of said operating system, the power management program in the computer system, stored in said second storage device is executed to constitute a power management apparatus that performs a CPU throttling operation of falsely reducing an operating frequency of a central processing unit (CPU).

* * * * *